(12) United States Patent
Chen et al.

(10) Patent No.: US 11,320,878 B1
(45) Date of Patent: May 3, 2022

(54) STORAGE DEVICE AND WORKING TEMPERATURE CALCULATION METHOD THEREOF

(71) Applicant: SOLID STATE STORAGE TECHNOLOGY CORPORATION, Taipei (TW)

(72) Inventors: Shi-Xuan Chen, Taipei (TW); I-Hsiang Chiu, Taipei (TW); Cheng-Chan He, Taipei (TW)

(73) Assignee: SOLID STATE STORAGE TECHNOLOGY CORPORATION, Taipei (TW)

( * ) Notice: Subject to any disclaimer, the term of this patent is extended or adjusted under 35 U.S.C. 154(b) by 35 days.

(21) Appl. No.: 16/952,118

(22) Filed: Nov. 19, 2020

(30) Foreign Application Priority Data

Oct. 19, 2020 (CN) .......................... 202011120870.4

(51) Int. Cl.
*G06F 1/20* (2006.01)
*G06F 1/3206* (2019.01)

(52) U.S. Cl.
CPC ............ *G06F 1/206* (2013.01); *G06F 1/3206* (2013.01)

(58) Field of Classification Search
CPC ..... G06F 1/206; G06F 1/3206; G06F 11/3034
USPC ......................................................... 700/300
See application file for complete search history.

(56) References Cited

U.S. PATENT DOCUMENTS

| | | | |
|---|---|---|---|
| 2007/0191993 A1* | 8/2007 | Wyatt ................. | G06F 11/3037 257/E23.08 |
| 2007/0211548 A1* | 9/2007 | Jain ..................... | G06F 11/3058 365/211 |
| 2009/0171513 A1* | 7/2009 | Tsukazawa ............. | G06F 1/206 700/300 |
| 2012/0218707 A1* | 8/2012 | Chan .................. | H05K 7/20518 361/679.48 |
| 2014/0148954 A1* | 5/2014 | Huang ................... | G06F 1/206 700/276 |
| 2014/0249770 A1* | 9/2014 | Cox ..................... | G06F 11/3037 702/130 |
| 2017/0160985 A1* | 6/2017 | Jayaraman ............ | G06F 3/0679 |

* cited by examiner

*Primary Examiner* — Chun Cao
(74) *Attorney, Agent, or Firm* — WPAT, PC

(57) ABSTRACT

A working temperature calculation method for a storage device of a server is provided. Firstly, n detected temperatures are converted into n transformed temperatures according to a composite temperature algorithm. If all of the n transformed temperatures are lower than a strengthen heat dissipation trigger temperature, the lowest temperature of the n transformed temperatures is set as a working temperature of the storage device. If at least one of the n transformed temperatures is higher than the strengthen heat dissipation trigger temperature, the highest temperature of the n transformed temperatures is set as the working temperature. When the storage device receives a temperature read command from the host, the storage device sends an information about the working temperature to the host, and the host controls a heat dissipation mode of the heat dissipation mechanism according to the working temperature.

11 Claims, 3 Drawing Sheets

FIG. 4A

| i | Temp$_{dTi}$ | Temp$_{preTi}$ | Temp$_{wTi}$ | Temp$_{tranTi}$ | Temp$_{workT}$ |
|---|---|---|---|---|---|
| 1 | 70°C | 85°C | 95°C | 61°C | |
| 2 | 40°C | 60°C | 70°C | 58°C | 58°C |
| 3 | 33°C | 50°C | 60°C | 59.8°C | |

FIG. 4B

| i | Temp$_{dTi}$ | Temp$_{preTi}$ | Temp$_{wTi}$ | Temp$_{tranTi}$ | Temp$_{workT}$ |
|---|---|---|---|---|---|
| 1 | 88°C | 85°C | 95°C | 71.8°C | 71.8°C |
| 2 | 55°C | 60°C | 70°C | 67°C | |
| 3 | 40°C | 50°C | 60°C | 64°C | |

FIG. 4C

| i | Temp$_{dTi}$ | Temp$_{preTi}$ | Temp$_{wTi}$ | Temp$_{tranTi}$ | Temp$_{workT}$ |
|---|---|---|---|---|---|
| 1 | 96°C | 85°C | 95°C | 76.6°C | 76.6°C |
| 2 | 66°C | 60°C | 70°C | 73.6°C | |
| 3 | 51°C | 50°C | 60°C | 70.6°C | |

US 11,320,878 B1

STORAGE DEVICE AND WORKING TEMPERATURE CALCULATION METHOD THEREOF

This application claims the benefit of People's Republic of China application Serial No. 202011120870.4, filed Oct. 19, 2020, the subject matter of which is incorporated herein by reference.

FIELD OF THE INVENTION

The present invention relates to an operating method for a storage device, and more particularly to a storage device for a server and an associated working temperature calculation method.

BACKGROUND OF THE INVENTION

FIG. 1 schematically illustrates the architecture of a conventional server. As shown in FIG. 1, the server 100 comprises a host 110, at least one storage device 120, a casing 130 and plural fans 132, 134. The host 110 and the storage device 120 are disposed within the casing 130. The host 110 is connected with the storage device 120 through an external bus 112. For example, the external bus 112 is a M.2 bus, a USB bus, a SATA bus, a PCIe bus, or the like. The host 110 is also connected with the fans 132 and 134 to control the rotation speeds of the fans 132 and 134. The storage device 120 can be a solid state drive, a hard disk drive, a magnetic tape or an optical disc drive. For example, the storage device 120 as shown in FIG. 1 is a solid state drive 120.

The server 100 further comprises plural electronic devices. The solid state drive 120 is one of the plural electronic devices. The other electronic devices include a dynamic random access memory (DRAM), a power supply, and so on.

When the server 100 is in a normal working state, the host 110 can access the data of the solid state drive 120 and control other electronic devices. During the operation of the server 100, the host 110, the solid state drive 120 and the other electronic devices within the casing 130 generate heat. For removing the heat from the internal portion of the casing 130, the rotation speeds of the fans 132 and 134 are adjusted by the host 110. Consequently, the host 110, the solid state drive 120 and the other electronic devices can be operated normally.

Generally, the solid state drive 120 of the server 100 is equipped with a temperature sensor (not shown). The temperature sensor is used for detecting the internal working temperature of the solid state drive 120. During the operation of the server 100, the host 110 periodically issues a temperature read command to the solid state drive 120 at a fixed time interval. In response to the temperature read command, the solid state drive 120 sends the information about the working temperature to the host 110.

In addition, the host 110 of the server 100 can collect the working temperatures of all electronic devices within the casing 130 and judge whether the internal temperature of the casing 130 is too high. If the internal temperature of the casing 130 is too high, the host 110 increases the rotation speeds of the fans 132 and 134 to facilitate removing the heat from the casing 130. When the internal temperature of the casing 130 is decreased, the host 110 decreases the rotation speeds of the fans 132 and 134. In other words, the host 110 of the server 100 enables a corresponding heat dissipation mechanism according to the working temperatures of the respective electronic devices.

However, the conventional server still has some drawbacks. For example, when the working temperature of the solid state drive 120 increases and the information about the working temperature is sent to the host 110 according to the temperature read command, the rotation speeds of the fans 132 and 134 are not increased by the host 110 as expected. Consequently, the solid state drive 120 is still working at the high temperature in the casing 130.

For preventing from the continuous increasing of the working temperature, the solid state drive 120 has to decrease the data accessing speed by itself. Since the data accessing speed of the solid state drive 120 decreases, the operation speed of the server 100 decreases. Under this circumstance, the performance of the server 100 is impaired.

SUMMARY OF THE INVENTION

An embodiment of the present invention provides a working temperature calculation method for a storage device. The storage device is connected with a host of a server. The storage device includes n temperature sensors for detecting n elements and generating n detected temperatures. The working temperature calculation method includes the following steps. Firstly, the n detected temperatures are converted into n transformed temperatures according to a composite temperature algorithm. If all of the n transformed temperatures are lower than a strengthen heat dissipation trigger temperature of a heat dissipation mechanism of the server, the lowest temperature of the n transformed temperatures is set as a working temperature of the storage device. If at least one of the n transformed temperatures is higher than the strengthen heat dissipation trigger temperature, the highest temperature of the n transformed temperatures is set as the working temperature. When the storage device receives a temperature read command from the host, the storage device sends an information about the working temperature to the host, and the host controls a heat dissipation mode of the heat dissipation mechanism according to the working temperature.

Another embodiment of the present invention provides a storage device. The storage device is connected with a host of a server. The server has a heat dissipation mechanism. The storage device includes n temperature sensors and a control circuit. The n temperature sensors detects n elements of the storage device and generates n detected temperatures. The control circuit receives the n detected temperatures, and executes a working temperature calculation method. The working temperature calculation method includes the following steps. The n detected temperatures are converted into n transformed temperatures according to a composite temperature algorithm. If all of the n transformed temperatures are lower than a strengthen heat dissipation trigger temperature of the heat dissipation mechanism, the lowest temperature of the n transformed temperatures is set as a working temperature of the storage device. If at least one of the n transformed temperatures is higher than the strengthen heat dissipation trigger temperature, the highest temperature of the n transformed temperatures is set as the working temperature. When the storage device receives a temperature read command from the host, the storage device sends an information about the working temperature to the host, and the host controls a heat dissipation mode of the heat dissipation mechanism according to the working temperature.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which:

FIGS. 4A, 4B and 4C are three examples illustrating the method of calculating the working temperature of the solid state drive according to the present invention.

DETAILED DESCRIPTION OF PREFERRED EMBODIMENTS

For allowing the host of the server to immediately enable the heat dissipation mechanism, the present invention provides a storage device for a server and an associated working temperature calculation method. The storage device is equipped with plural temperature sensors. The detected temperatures of the temperature sensors are converted into plural transformed temperatures according to a composite temperature algorithm. Moreover, one of the plural transformed temperatures is selected as the working temperature of the storage device. When the host of the server issues a temperature read command to the storage device, the storage device sends the information about the working temperature to the host. According to the working temperature, the host controls the operation mode of the heat dissipation mechanism. The storage device is a solid state drive, a hard disk drive, a magnetic tape, an optical disc drive or any other appropriate storage device. In the following embodiments, the solid state drive is taken as an example of the storage device. In the following embodiment, a fan is a heat dissipation mechanism that uses air as the cooling medium for cooling the storage device. It is noted that the example of the heat dissipation mechanism is not restricted. For example, the heat dissipation mechanism using liquid (e.g., water, oil or other heat conduction liquid) as the cooling medium is also feasible.

Figure 1:
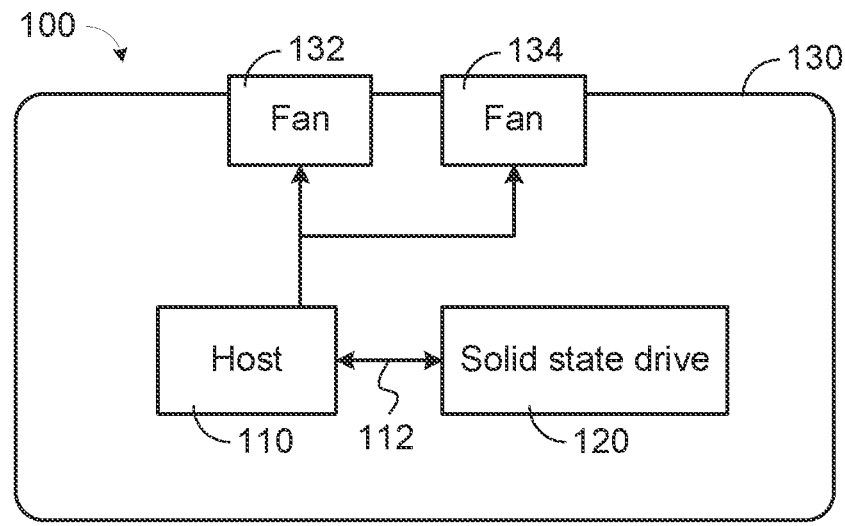
FIG. 1 (prior art) schematically illustrates the architecture of a conventional server.
Figure 2:
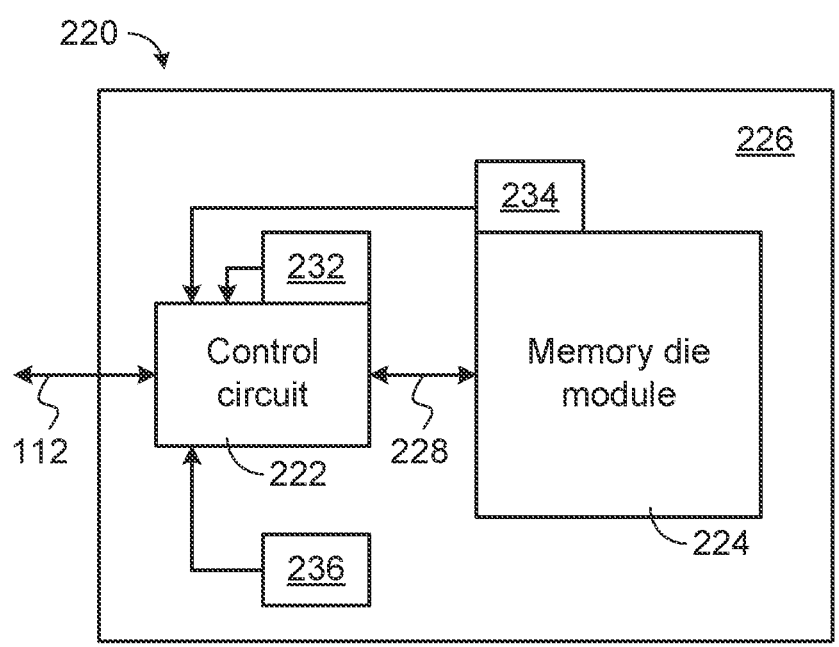
FIG. 2 schematically illustrates the architecture of a solid state drive for a server according to an embodiment of the present invention.

FIG. 2 schematically illustrates the architecture of a solid state drive for a server according to an embodiment of the present invention. The solid state drive 220 can be installed in the server 100 as shown in FIG. 1. In an embodiment, the solid state drive 220 comprises a control circuit 222, a memory die module 224, a printed circuit board (PCB) 226 and plural temperature sensors 232, 234, 236. The control circuit 222 and the memory die module 224 are installed on the printed circuit board 226. Moreover, the control circuit 222 is electrically connected with a host (not shown) of the server through an external bus 112.

In the solid state drive 220, the control circuit 222 is connected with the memory die module 224 through an internal bus 228. The temperature sensors 232, 234 and 236 are contacted with the control circuit 222, the memory die module 224 and the printed circuit board 226, respectively. The temperature sensors 232, 234 and 236 are used for detecting the temperatures of the control circuit 222, the memory die module 224 and the printed circuit board 226, respectively. The memory die module 224 is a combination of plural memory dies (not shown). For example, the memory dies include NAND dies.

In this embodiment, temperature sensors 232, 234 and 236 are contacted with the control circuit 222, the memory die module 224 and the printed circuit board 226, respectively. It is noted that numerous modifications and alterations may be made while retaining the teachings of the invention. For example, in another embodiment, the solid state drive 220 is equipped with more temperature sensors (not shown). These temperature sensors are disposed within the solid state drive 220 and contacted with other elements. For example, one temperature sensor is contacted with the DRAM (not shown) of the solid state drive 220 in order to detect the temperature of the DRAM.

In an embodiment, the detected temperatures of the temperature sensors 232, 234 and 236 are calculated by a firmware of the control circuit 222 according to a composite temperature algorithm. Consequently, plural transformed temperatures are obtained. When the host of the server issues a temperature read command to the solid state drive 220, one of the plural transformed temperatures is selected as the working temperature and the information about the working temperature is sent to the host.

The composite temperature algorithm is designed according to a strengthen heat dissipation trigger temperature of the heat dissipation mechanism, which is provided by the manufacturer of the server. The strengthen heat dissipation trigger temperature is the temperature that the heat dissipation capacity is started to be strengthened. In an example, the heat dissipation mechanism is a fan, and the strengthen heat dissipation trigger temperature of the fan is 70° C. If the internal temperature of the casing of the server is higher than 70° C., the host of the server has to change the heat dissipation mode of the fan. For example, the rotation speed of the fan is increased, and thus the heat dissipation capacity is strengthened. Whereas, if the internal temperature of the casing of the server is lower than 70° C., the host of the server does not change the heat dissipation mode of the fan. That is, the fan is operated at the normal rotation speed.

Alternatively, the heat dissipation mechanism is a liquid cooler, and the strengthen heat dissipation trigger temperature of the liquid cooler is 70° C. If the internal temperature of the casing of the server is higher than 70° C., the host of the server has to change the heat dissipation mode of the liquid cooler. For example, the flow velocity or flow rate of the cooling medium in the liquid cooler is increased, and thus the heat dissipation capacity is strengthened. Whereas, if the internal temperature of the casing of the server is lower than 70° C., the host of the server does not change the heat dissipation mode of the liquid cooler. That is, the flow velocity or the flow rate of the cooling medium in the liquid cooler is not adjusted.

The strengthen heat dissipation trigger temperature of the server is provided by the manufacturer of the server. Alternatively, the strengthen heat dissipation trigger temperature of the server is provided by the manufacturer of the solid state drive 220 after the server is tested.

Figure 3:
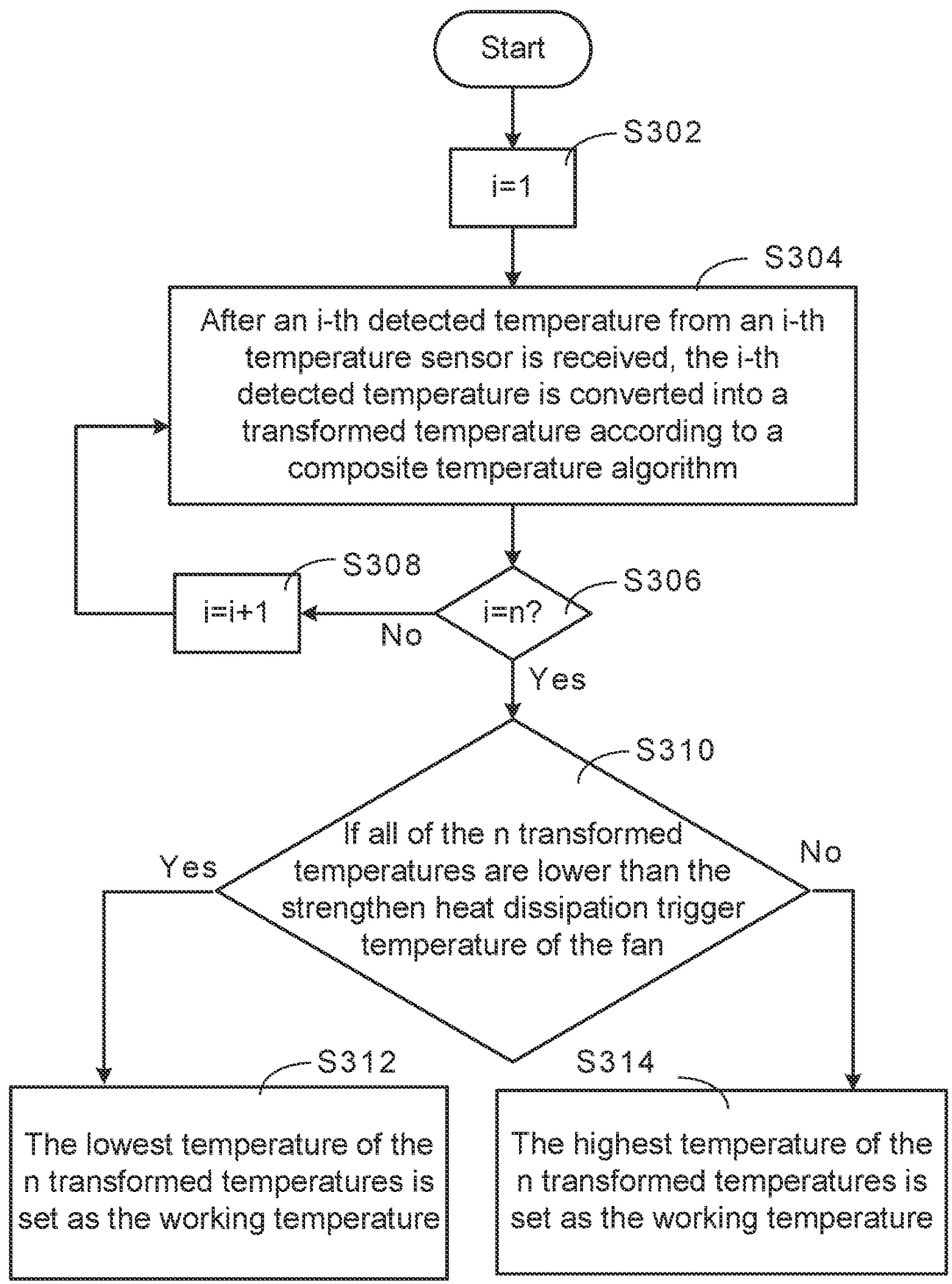
FIG. 3 is a flowchart illustrating a working temperature calculation method according to an embodiment of the present invention.

FIG. 3 is a flowchart illustrating a working temperature calculation method according to an embodiment of the present invention. It is assumed that the solid state drive 220 is equipped with n temperature sensors and the temperature sensors are contacted with n elements in the solid state drive 220, wherein n is a positive integer larger than 1. The flowchart of FIG. 3 is periodically performed by the control circuit 222 at a specified time interval. For example, the flowchart of FIG. 3 is periodically performed by the control circuit 222 at the time interval of 1 minute.

Firstly, the value i is set as 1 (Step S302). After the control circuit 222 receives the i-th detected temperature from the i-th temperature sensor, the control circuit 222 calculates the i-th detected temperature according to a composite temperature algorithm, so that a transformed temperature is obtained (Step S304).

Then, a step S306 is performed to judge whether i is equal to n in order to judge whether the n detected temperatures from the n temperature sensors have been converted into the n transformed temperatures. If i is not equal to n, 1 is added to i (Step S308) and the step S304 is repeatedly done.

If i is equal to n, it means that the n detected temperatures from the n temperature sensors have been converted into the n transformed temperatures. A step S310 is performed to judge whether the n transformed temperatures are lower than a strengthen heat dissipation trigger temperature of the fan.

If all of the n transformed temperatures are lower than the strengthen heat dissipation trigger temperature of the fan, the lowest temperature of the n transformed temperatures is set as a working temperature (Step S312). When the control circuit 222 of the solid state drive 220 receives a temperature read command from the host, the control circuit 222 sends the information about the working temperature to the host. Since the working temperature is lower than the strengthen heat dissipation trigger temperature of the fan, the host of the server does not change the heat dissipation mode of the fan when the information about the working temperature is received by the host. That is, the fan is operated at the normal rotation speed.

If at least one of the n transformed temperatures is higher than the strengthen heat dissipation trigger temperature of the fan, the highest temperature of the n transformed temperatures is set as the working temperature (Step S314). When the control circuit 222 of the solid state drive 220 receives the temperature read command from the host, the control circuit 222 sends the information about the working temperature to the host. Since the working temperature is higher than the strengthen heat dissipation trigger temperature of the fan, the host of the server changes the heat dissipation mode of the fan when the information about the working temperature is received by the host. The rotation speed of the fan is increased, and thus the heat dissipation capacity is strengthened.

The heat dissipation mechanism is not restricted to the fan. Alternatively, the heat dissipation mechanism is a liquid cooler. If the working temperature is lower than the strengthen heat dissipation trigger temperature of the liquid cooler, the host of the server does not change the heat dissipation mode of the liquid cooler. That is, the flow velocity or the flow rate of the cooling medium in the liquid cooler is not adjusted. If the working temperature is higher than the strengthen heat dissipation trigger temperature of the liquid cooler, the host of the server has to change the heat dissipation mode of the liquid cooler. For example, the flow velocity or the flow rate of the cooling medium in the liquid cooler is increased, and thus the heat dissipation capacity is strengthened.

A method of processing the detected temperature into the transformed temperature according to a composite temperature algorithm will be described as follows. In this example, the storage device is the solid state drive 220 as shown in FIG. 2, and the heat dissipation mechanism is the fan.

During the process of designing the solid state drive 220, plural warning temperatures and plural pre-warning temperatures corresponding to the plural elements of the solid state drive 220 are set by the manufacturer. For example, a first pre-warning temperature ($Temp_{preT1}$) and a first warning temperature ($Temp_{wT1}$) corresponding to the control circuit 222 are respectively 85° C. and 95° C., a second pre-warning temperature ($Temp_{preT2}$) and a second warning temperature ($Temp_{wT2}$) corresponding to the memory die module 224 are respectively 60° C. and 70° C., and a third pre-warning temperature ($Temp_{preT3}$) and a third warning temperature ($Temp_{wT3}$) corresponding to the printed circuit board 226 are respectively 50° C. and 60° C.

In case that a specified element of the solid state drive 220 is operated at a temperature higher than the corresponding pre-warning temperature, the performance of the specified element will be gradually decreased. In case that the specified element of the solid state drive 220 is operated at the temperature higher than the corresponding warning temperature, the performance of the specified element is largely impaired and it is necessary to cool down the specified element.

For example, in case that the control circuit 222 is operated at the temperature lower than the first pre-warning temperature ($Temp_{preT1}$), the performance of the control circuit 222 is satisfied. In case that the control circuit 222 is operated at the temperature between the first pre-warning temperature ($Temp_{preT1}$) and the first warning temperature ($Temp_{wT1}$), the performance of the control circuit 222 will be gradually decreased. In case that the control circuit 222 is operated at the temperature higher than the first warning temperature ($Temp_{wT1}$), the performance of the control circuit 222 is largely impaired. Under this circumstance, it is necessary to cool down the control circuit 222 immediately.

As mentioned above, the temperature sensors 232, 234 and 236 are contacted with the control circuit 222, the memory die module 224 and the printed circuit board 226, respectively. During the operations of the solid state drive 220, the temperature sensor 232 detects the control circuit 222 to generate a first detected temperature ($Temp_{dT1}$), the temperature sensor 234 detects the memory die module 224 to generate a second detected temperature ($Temp_{dT2}$), and the temperature sensor 236 detects the printed circuit board 226 to generate a third detected temperature ($Temp_{dT3}$).

Due to the above relationships, the transformed temperature is obtained according to the composite temperature algorithm and expressed by the following mathematic formula:

$$Temp_{tranTi} = \frac{Level_{fanmax} \cdot (Temp_{dTi} - Temp_{preTi})}{(Temp_{wTi} - Temp_{preTi})} + Temp_{trigger}$$

According to the composite temperature algorithm, the transformed temperature ($Temp_{tranTi}$) and the detected temperature ($Temp_{dTi}$) are in a non-linear mapping relationship. Alternatively, other algorithms may be designed in different storage devices. According to the composite temperature algorithm, the detected temperatures of the temperature sensors are converted into normalized temperatures. Consequently, the host can select the corresponding heat dissipation mode earlier.

The fan of the server can be selectively operated in one of plural different heat dissipation modes. For example, the heat dissipation modes include a super cooling mode, an enhanced cooling mode, a medium cooling mode, a weak cooling mode, a normal cooling mode, and so on. The rotation speeds of the fan and the heat dissipation capacities corresponding to different heat dissipation modes are different. In case that the maximum fan level ($Level_{fanmax}$) is 6, the fan can be operated in one of six heat dissipation modes corresponding to six fan levels. Consequently, the heat dissipation mode and the rotation speed of the fan are adjustable. In case that the number of the temperature sensors is n, i is a positive integer between 1 and n.

In other words, after the detected temperature ($Temp_{dTi}$), the pre-warning temperature ($Temp_{preTi}$) and the warning temperature ($Temp_{wTi}$) of the specified element and the maximum fan level ($Level_{fanmax}$) and the strengthen heat dissipation trigger temperature of the fan ($Temp_{trigger}$) are introduced into the mathematic formula of the composite temperature algorithm, the transformed temperature ($Temp_{tranTi}$) of the specified element is calculated.

FIGS. 4A, 4B and 4C are three examples illustrating the method of calculating the working temperature of the solid state drive according to the present invention. For example, the strengthen heat dissipation trigger temperature of the fan ($Temp_{trigger}$) is 70° C., and the maximum fan level ($Level_{fanmax}$) is 6.

In the example of FIG. 4A, the first detected temperature ($Temp_{dT1}$) of the control circuit 222 detected by the temperature sensor 232 is 70° C., the second detected temperature ($Temp_{dT2}$) of the memory die module 224 detected by the temperature sensor 234 is 40° C., and the third detected temperature ($Temp_{dT3}$) of the printed circuit board 226 detected by the temperature sensor 236 is 33° C.

According to the composite temperature algorithm, the first transformed temperature ($Temp_{tranT1}$) is 61° C., the second transformed temperature ($Temp_{tranT2}$) is 58° C., and the third transformed temperature ($Temp_{tranT3}$) is 59.8° C. Since all of the three transformed temperatures are lower than the strengthen heat dissipation trigger temperature of the fan ($Temp_{trigger}$, i.e., 70° C.), and the second transformed temperature ($Temp_{tranT2}$, i.e., 58° C.) is the lowest transformed temperature. The second transformed temperature is set as the working temperature ($Temp_{workT}$) of the solid state drive 220 by the control circuit 222.

When the control circuit 222 of the solid state drive 220 receives a temperature read command from the host, the information about the working temperature ($Temp_{workT}$) of the solid state drive 220, i.e., 58° C., is sent from the control circuit 222 to the host. Since the working temperature (i.e., 58° C.) of the solid state drive 220 is lower than the strengthen heat dissipation trigger temperature of the fan (i.e., 70° C.), the rotation speed of the fan is not increased.

Since the elements of the solid state drive 220 are operated at the temperatures lower than the corresponding warning temperatures of the elements, the value of each detected temperature minus the warning temperature is negative according to the composite temperature algorithm. In other words, all of the transformed temperatures according to the calculation are lower than the strengthen heat dissipation trigger temperature of the fan ($Temp_{trigger}$).

In the example of FIG. 4B, the first detected temperature ($Temp_{dT1}$) of the control circuit 222 detected by the temperature sensor 232 is 88° C., the second detected temperature ($Temp_{dT2}$) of the memory die module 224 detected by the temperature sensor 234 is 55° C., and the third detected temperature ($Temp_{dT3}$) of the printed circuit board 226 detected by the temperature sensor 236 is 40° C.

According to the composite temperature algorithm, the first transformed temperature ($Temp_{tranT1}$) is 71.8° C., the second transformed temperature ($Temp_{tranT2}$) is 67° C., and the third transformed temperature ($Temp_{tranT3}$) is 64.8° C.

Since the control circuit 222 is operated at the temperature higher than the corresponding first pre-warning temperature ($Temp_{preT1}$, i.e., 85° C.), the value of the first detected temperature ($Temp_{dT1}$) minus the first pre-warning temperature ($Temp_{preT1}$) is positive. The first transformed temperature ($Temp_{tranT1}$, e.g., 71.8° C.) obtained according to the composite temperature algorithm is higher than the strengthen heat dissipation trigger temperature of the fan ($Temp_{trigger}$, i.e., 70° C.). Since the other elements are operated at the temperatures lower than the corresponding pre-warning temperatures, the corresponding transformed temperatures are lower than the strengthen heat dissipation trigger temperature of the fan ($Temp_{trigger}$, i.e., 70° C.).

Since the first transformed temperature ($Temp_{tranT1}$, i.e., 71.8° C.) is higher than the strengthen heat dissipation trigger temperature of the fan ($Temp_{trigger}$, i.e., 70° C.), the first transformed temperature ($Temp_{tranT1}$, i.e., 71.8° C.) is set as the working temperature ($Temp_{workT}$) of the solid state drive 220 by the control circuit 222.

When the control circuit 222 of the solid state drive 220 receives a temperature read command from the host, the information about the working temperature ($Temp_{workT}$) of the solid state drive 220, i.e., 71.8° C., is sent from the control circuit 222 to the host. Since the working temperature (i.e., 71.8° C.) of the solid state drive 220 is higher than the strengthen heat dissipation trigger temperature of the fan (i.e., 70° C.), the heat dissipation mode of the fan will be changed and the rotation speed of the fan will be increased. For example, the fan level is increased from level 1 to level 2. In an embodiment, the level number to be adjusted is determined according to the difference between the working temperature ($Temp_{workT}$) and the strengthen heat dissipation trigger temperature of the fan ($Temp_{trigger}$). For example, if the difference is 5° C., the fan level corresponding to the rotation speed is increased for one level. Similarly, if the difference is 10° C., the fan level corresponding to the rotation speed is increased for two levels. But the present invention is not limited to the embodiments described above.

As mentioned above, when any element of the solid state drive 220 is operated at the temperature higher than the corresponding pre-warning temperature, the working temperature ($Temp_{workT}$) obtained by the control circuit 222 is higher than the strengthen heat dissipation trigger temperature of the fan ($Temp_{trigger}$). According to the temperature read command, the information about the working temperature ($Temp_{workT}$) is sent to the host. Consequently, the heat dissipation mode of the fan is changed. For example, as the rotation speed of the fan is increased, the heat within the casing can be dissipated away at a faster rate.

In the example of FIG. 4C, the first detected temperature ($Temp_{dT1}$) of the control circuit 222 detected by the temperature sensor 232 is 96° C., the second detected temperature ($Temp_{dT2}$) of the memory die module 224 detected by the temperature sensor 234 is 66° C., and the third detected temperature ($Temp_{dT3}$) of the printed circuit board 226 detected by the temperature sensor 236 is 51° C.

According to the composite temperature algorithm, the first transformed temperature ($Temp_{tranT1}$) is 76.6° C., the second transformed temperature ($Temp_{tranT2}$) is 73.6° C., and the third transformed temperature ($Temp_{tranT3}$) is 70.6° C. Since the first transformed temperature ($Temp_{tranT1}$, i.e., 76.6° C.) is the highest transformed temperature, the first transformed temperature is set as the working temperature (Temp$_{workT}$) of the solid state drive 220 by the control circuit 222.

When the control circuit 222 of the solid state drive 220 receives a temperature read command from the host, the information about the working temperature (Temp$_{workT}$) of the solid state drive 220, i.e., 76.6° C., is sent from the control circuit 222 to the host. Since the working temperature (i.e., 76.6° C.) of the solid state drive 220 is higher than the strengthen heat dissipation trigger temperature of the fan (i.e., 70° C.), the heat dissipation mode of the fan will be changed and the rotation speed of the fan will be increased. For example, the fan level is increased from level 1 to level 2. In an embodiment, the level number to be adjusted is determined according to the difference between the working temperature (Temp$_{workT}$) and the strengthen heat dissipation trigger temperature of the fan (Temp$_{trigger}$). For example, if the difference is 5° C., the fan level corresponding to the rotation speed is increased for one level. Similarly, if the difference is 10° C., the fan level corresponding to the rotation speed is increased for two levels. But the present invention is not limited to the embodiments described above.

It is noted that the composite temperature algorithm may be varied according to the practical requirement. For example, in another embodiment, the working temperature (Temp$_{workT}$) higher than the strengthen heat dissipation trigger temperature of the fan (Temp$_{trigger}$) is obtained whenever the element is operated at the temperature higher than the corresponding pre-warning temperature. For example, the transformed temperature is obtained according to the composite temperature algorithm and expressed by the following mathematic formula:

$$\text{Temp}_{tranTi}=C\cdot(\text{Temp}_{dTi}-\text{Temp}_{preTi})+\text{Temp}_{trigger}$$

In the above mathematic formula, C is a positive constant value, Temp$_{tranTi}$ is the transformed temperature, Temp$_{dTi}$ is the detected temperature, Temp$_{preTi}$ is the pre-warning temperature, and Temp$_{trigger}$ is the strengthen heat dissipation trigger temperature of the fan.

According to the composite temperature algorithm, the transformed temperature (Temp$_{tranTi}$) and the detected temperature (Temp$_{dTi}$) are in a non-linear mapping relationship. Alternatively, other algorithms may be designed in different storage devices. According to the composite temperature algorithm, the detected temperatures of the temperature sensors are converted into normalized temperatures. Consequently, the host can select the corresponding heat dissipation mode earlier.

In the above embodiments, the fan is taken as the example of the heat dissipation mechanism. In other embodiments, the heat dissipation mechanism is a liquid cooler. The liquid cooler can be operated in one of plural heat dissipation modes corresponding to plural levels from a first level to a maximum level. Consequently, the flow velocity or the flow rate of the liquid medium is adjustable. Similarly, the liquid cooler has a strengthen heat dissipation trigger temperature. The liquid cooler of the server can be selectively operated in one of plural different heat dissipation modes. For example, the heat dissipation modes include a super cooling mode, an enhanced cooling mode, a medium cooling mode, a weak cooling mode, a normal cooling mode, and so on. The flow velocities or flow rates of the liquid cooler and the heat dissipation capacities corresponding to different heat dissipation modes are different. The operations are similar to those of the fan, and not redundantly described herein.

From the above descriptions, the present invention provides a storage device for a server and an associated working temperature calculation method. The storage device is equipped with plural temperature sensors for detecting the temperatures of the corresponding elements. Each element of the storage device has a corresponding pre-warning temperature. When the detected temperature of any element is higher than the corresponding pre-warning temperature, the detected temperature is converted into the corresponding transformed temperature by the control circuit according to the composite temperature algorithm. The transformed temperature is higher than the strengthen heat dissipation trigger temperature of the heat dissipation mechanism of the server. In addition, the highest transformed temperature is set as the working temperature.

According to the temperature read command, the information about the working temperature is sent to the host of the server. Consequently, the heat dissipation mode of the heat dissipation mechanism is changed. For example, as the rotation speed of the fan is increased or the flow velocity or flow rate of the liquid medium is increased, the heat within the casing can be dissipated away at a faster rate.

In the embodiment of FIG. 2, the solid state drive is equipped with three temperature sensors. It is noted that the number of the temperature sensors is not restricted. For example, the storage device with two temperature sensors or more than three temperature sensors for detecting the temperatures of the corresponding elements is feasible. In some embodiments, one element is detected by plural temperature sensors.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A working temperature calculation method for a storage device, the storage device being connected with a host of a server, the storage device comprising n temperature sensors for detecting n elements in the storage device and generating n detected temperatures, the working temperature calculation method comprising steps of:
   converting the n detected temperatures into n transformed temperatures according to a composite temperature algorithm;
   when all of the n transformed temperatures are lower than a strengthen heat dissipation trigger temperature of a heat dissipation mechanism of the server, setting the lowest temperature of the n transformed temperatures as a working temperature of the storage device; and
   when at least one of the n transformed temperatures is higher than the strengthen heat dissipation trigger temperature, setting the highest temperature of the n transformed temperatures as the working temperature,
   wherein when the storage device receives a temperature read command from the host, the storage device sends an information about the working temperature to the host, and the host controls a heat dissipation mode of the heat dissipation mechanism according to the working temperature,
   wherein a first temperature sensor of the n temperature sensors is contacted with a first element of the n elements to generate a first detected temperature, wherein when the first detected temperature is higher than a first pre-warning temperature of the first element, the first detected temperature is converted into a first transformed temperature according to the composite temperature algorithm, wherein the first transformed temperature is higher than the strengthen heat dissipation trigger temperature, wherein the first transformed temperature is equal to the sum of the strengthen heat dissipation trigger temperature and a constant multiplied by a first difference value, wherein the first difference value is obtained by subtracting the first pre-warning temperature from the first detected temperature.

2. The working temperature calculation method as claimed in claim 1, wherein the storage device periodically enables the composite temperature algorithm at a specified time interval.

3. The working temperature calculation method as claimed in claim 1, wherein the heat dissipation mechanism of the server is a fan, wherein the fan has a strengthen heat dissipation trigger temperature and M fan levels corresponding to plural heat dissipation modes, and the first element has a first warning temperature, wherein the first transformed temperature is equal to the sum of the strengthen heat dissipation trigger temperature and a first calculated value, wherein the first calculated value is equal to a product of M and a first difference value divided by a second difference value, wherein the first difference value is obtained by subtracting the first pre-warning temperature from the first detected temperature, and the second difference value is obtained by subtracting the first pre-warning temperature from the first warning temperature.

4. The working temperature calculation method as claimed in claim 3, wherein if the working temperature is higher than the strengthen heat dissipation trigger temperature, a number of the fan levels to be adjusted is determined according to a difference between the working temperature and the strengthen heat dissipation trigger temperature.

5. The working temperature calculation method as claimed in claim 1, wherein the heat dissipation mechanism of the server is a liquid cooler, wherein the liquid cooler has a strengthen heat dissipation trigger temperature and M flow velocity levels or M flow rate levels corresponding to plural heat dissipation modes, and the first element has a first warning temperature, wherein the first transformed temperature is equal to the sum of the strengthen heat dissipation trigger temperature and a first calculated value, wherein the first calculated value is equal to a product of M and a first difference value divided by a second difference value, wherein the first difference value is obtained by subtracting the first pre-warning temperature from the first detected temperature, and the second difference value is obtained by subtracting the first pre-warning temperature from the first warning temperature.

6. The working temperature calculation method as claimed in claim 5, wherein if the working temperature is higher than the strengthen heat dissipation trigger temperature, a number of the flow velocity levels or the flow rate levels to be adjusted is determined according to a difference between the working temperature and the strengthen heat dissipation trigger temperature.

7. A storage device being connected with a host of a server, the server having a heat dissipation mechanism, the storage device comprising:

n temperature sensors for detecting n elements of the storage device and generating n detected temperatures; and a control circuit receiving the n detected temperatures, and executing a working temperature calculation method, wherein the working temperature calculation method comprises steps of:

converting the n detected temperatures into n transformed temperatures according to a composite temperature algorithm;

when all of the n transformed temperatures are lower than a strengthen heat dissipation trigger temperature of the heat dissipation mechanism, setting the lowest temperature of the n transformed temperatures as a working temperature of the storage device; and when at least one of the n transformed temperatures is higher than the strengthen heat dissipation trigger temperature, setting the highest temperature of the n transformed temperatures as the working temperature, wherein when the storage device receives a temperature read command from the host, the storage device sends an information about the working temperature to the host, and the host controls a heat dissipation mode of the heat dissipation mechanism according to the working temperature, wherein a first temperature sensor of the n temperature sensors is contacted with a first element of the n elements to generate a first detected temperature, wherein if the first detected temperature is higher than a first pre-warning temperature of the first element, the first detected temperature is converted into a first transformed temperature according to the composite temperature algorithm, wherein the first transformed temperature is higher than the strengthen heat dissipation trigger temperature, wherein the first transformed temperature is equal to the sum of the strengthen heat dissipation trigger temperature and a constant multiplied by a first difference value, wherein the first difference value is obtained by subtracting the first pre-warning temperature from the first detected temperature.

8. The storage device as claimed in claim 7, wherein the heat dissipation mechanism of the server is a fan, wherein the fan has a strengthen heat dissipation trigger temperature and M fan levels corresponding to plural heat dissipation modes, and the first element has a first warning temperature, wherein the first transformed temperature is equal to the sum of the strengthen heat dissipation trigger temperature and a first calculated value, wherein the first calculated value is equal to a product of M and a first difference value divided by a second difference value, wherein the first difference value is obtained by subtracting the first pre-warning temperature from the first detected temperature, and the second difference value is obtained by subtracting the first pre-warning temperature from the first warning temperature.

9. The storage device as claimed in claim 8, wherein if the working temperature is higher than the strengthen heat dissipation trigger temperature, a number of the fan levels to be adjusted is determined according to a difference between the working temperature and the strengthen heat dissipation trigger temperature.

10. The storage device as claimed in claim 7, wherein the heat dissipation mechanism of the server is a liquid cooler, wherein the liquid cooler has a strengthen heat dissipation trigger temperature and M flow velocity levels or M flow rate levels corresponding to plural heat dissipation modes, and the first element has a first warning temperature, wherein the first transformed temperature is equal to the sum of the strengthen heat dissipation trigger temperature and a first calculated value, wherein the first calculated value is equal to a product of M and a first difference value divided by a second difference value, wherein the first difference value is obtained by subtracting the first pre-warning temperature from the first detected temperature, and the second difference value is obtained by subtracting the first pre-warning temperature from the first warning temperature.

11. The storage device as claimed in claim 10, wherein if the working temperature is higher than the strengthen heat dissipation trigger temperature, a number of the flow velocity levels or the flow rate levels to be adjusted is determined according to a difference between the working temperature and the strengthen heat dissipation trigger temperature.

\* \* \* \* \*